US007962362B2

(12) United States Patent
Huang et al.

(10) Patent No.: US 7,962,362 B2
(45) Date of Patent: Jun. 14, 2011

(54) PROMOTING CUSTOMER LOYALTY

(75) Inventors: Yih Lerh Huang, Ottawa (CA); Jerzy Prekurat, Ottawa (CA)

(73) Assignee: Canadian Bank Note Company, Limited, Ottawa, Ontario (CA)

( * ) Notice: Subject to any disclaimer, the term of this patent is extended or adjusted under 35 U.S.C. 154(b) by 2016 days.

(21) Appl. No.: 10/916,071

(22) Filed: Aug. 11, 2004

(65) Prior Publication Data
US 2006/0036482 A1 Feb. 16, 2006

(51) Int. Cl.
*G06Q 30/00* (2006.01)
(52) U.S. Cl. .................................... 705/14.31
(58) Field of Classification Search ............ 705/14, 705/14.31; 463/25, 17
See application file for complete search history.

(56) References Cited

U.S. PATENT DOCUMENTS

| | | | |
|---|---|---|---|
| 5,645,486 A | 7/1997 | Nagao et al. | |
| 5,916,024 A | 6/1999 | Von Kahorn | |
| 5,970,143 A | 10/1999 | Schneier et al. | |
| 5,984,779 A | 11/1999 | Bridgeman et al. | |
| 6,017,032 A * | 1/2000 | Grippo et al. | 273/138.1 |
| 6,210,276 B1 | 4/2001 | Mullins | |
| 6,222,914 B1 | 4/2001 | McMullin | |
| 6,223,163 B1 | 4/2001 | Von Luchene | |
| 6,267,670 B1 * | 7/2001 | Walker et al. | 463/17 |
| 6,296,569 B1 | 10/2001 | Congello, Jr. | |
| 6,324,558 B1 | 11/2001 | Wiber | |
| 6,390,473 B1 | 5/2002 | Vancura et al. | |
| 6,435,511 B1 | 8/2002 | Vancura et al. | |
| 6,565,434 B1 * | 5/2003 | Acres | 463/25 |
| 6,578,735 B1 | 6/2003 | Mothwurf | |
| 6,666,768 B1 * | 12/2003 | Akers | 463/40 |
| 6,687,679 B1 * | 2/2004 | Van Luchene et al. | 705/14 |
| 2001/0039511 A1 | 11/2001 | Duckworth et al. | |
| 2002/0037766 A1 * | 3/2002 | Muniz | 463/17 |
| 2002/0062368 A1 * | 5/2002 | Holtzman et al. | 709/224 |
| 2002/0077174 A1 * | 6/2002 | Luciano et al. | 463/25 |
| 2004/0077408 A1 | 4/2004 | D'Amico et al. | |
| 2004/0077422 A1 | 4/2004 | Bryant et al. | |
| 2004/0176158 A1 * | 9/2004 | Baldwin | 463/17 |

\* cited by examiner

*Primary Examiner* — John G Weiss
*Assistant Examiner* — Darnell Pouncil
(74) *Attorney, Agent, or Firm* — Seager, Tuft & Wickhem LLC

(57) ABSTRACT

A lottery system and method is disclosed which promotes the continued play of a participant by rewarding them, on a pro-rated basis, for their loyalty. There are two aspects to the invention: (i) the tracking of a player's behaviour; and (ii) calculating a lottery payout structure based on the player's behaviour. In general, players are recognized for their loyalty or patronage, with those demonstrating superior loyalty being awarded a greater amount of a loyalty prize pot. In the event that several players select the winning number in a given lottery, the main prize would be equally divided amongst them. However, for those particularly loyal customers, additional moneys would be paid out from a loyalty reward pot. A mathematical formula in the form of a decay function incorporating the recency, frequency and intensity of a player's lottery ticket purchases would establish whether or not a player qualifies for a loyalty reward payout from the loyalty reward pot as well as the amount to be awarded.

19 Claims, 2 Drawing Sheets

PROMOTING CUSTOMER LOYALTY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever

BACKGROUND OF THE INVENTION

1. Field of Invention

The invention relates to the field of lottery systems and more particularly to a lottery system which rewards a player's loyalty.

2. Description of the Related Prior Art

Generally speaking, the concept of promoting customer loyalty by issuing rewards or bonuses to particularly loyal customers is known in the art. U.S. Pat. No. 6,578,735 for example, provides a method of promoting customer loyalty by analyzing customer purchases at a point-of-sale (POS) terminal to determine if a customer has purchased products equaling or exceeding a predetermined value and, if this is the case, entitling the customer to participate in a bonus ticket game configured as a game of chance. Similarly, U.S. Pat. No. 6,222,914 teaches a system and method for administering an incentive award program wherein award points are earned in response to customer purchases of goods and services by credit card and then credited to the customer's credit account. The calculation of award points is based at least in part upon the charges to the customer credit card.

The concept of reserving a certain percentage of the revenue generated by the sale of tickets associated with a given lottery for a "loyalty reward pot" is also known in the art. For example, U.S. Pat. No. 5,645,486 teaches a gaming system which includes a master controller operatively connected to a plurality of gaming controllers, the master controller adding a predetermined percentage of the bet coins or tokens reported by each of the gaming controllers to a saved (or progressive) bonus value.

The concept of qualifying for a bonus award at a second level of game play only upon an event (such as winning) occurring at a first level of game play is also discussed in the prior art. For example, U.S. Pat. No. 5,645,486 teaches a gaming system in which to qualify for a bonus award (or second level), a player must first get a predetermined winning combination (at a first level). In this lottery scheme, all players have a chance to receive the progressive bonus upon getting a predetermined winning combination, regardless of the number of coins that player wagers initially. In addition, U.S. Pat. No. 6,210,276 teaches a game with a first level of game play (and corresponding first win opportunity) and a second level of game play with a second win opportunity that provides further incentive to the player to play the game. Contingencies of the first level of game play need to be satisfied in order to enter and play the second level of game play.

Although the prior art systems work adequately, they do not describe a lottery system which rewards players on a pro-rated basis, dependent upon their ticket purchasing habits and the winning of a first lottery event.

SUMMARY OF THE INVENTION

In order to overcome the deficiencies of the prior art there is provided a lottery system and method which promotes the continued play of a participant by rewarding them for their loyalty. There are two aspects to the invention: (i) the tracking of a player's behaviour; and (ii) calculating a lottery payout structure based on the player's behaviour. In general, players are recognized for their loyalty or patronage, with those demonstrating superior loyalty being awarded a greater amount of a loyalty prize pot.

The lottery loyalty system and method of the proposed invention contemplates reserving a percentage or fraction of the available prize money for a player loyalty reward pool. The loyalty reward is paid out on the basis of three criteria: (a) recency of player purchase; (b) frequency of player purchase; and (c) intensity of player purchase. In the event that several players select the winning number, main prize would be equally divided amongst them. However, for those particularly loyal customers, additional moneys would be paid out from the player loyalty reward pool. A mathematical formula in the form of a decay function incorporating the three criteria above would establish whether or not a player qualifies for a loyalty reward payout from the VIP pot as well as the amount to be awarded. For example, a winning customer who had purchased many tickets over several days in the weeks leading up to the lottery would qualify for a loyalty reward payout whereas a winning customer who had purchased a single ticket on the day of the lottery would not qualify for a loyalty reward payout. Furthermore, the actual value of the loyalty reward payout for a particular customer would be pro-rated based on their calculated loyalty figure e.g. less money is paid out as the customer's purchases decrease over time.

In accordance with one aspect of the invention there is provided a method for promoting customer loyalty comprising: establishing a lottery event comprising a main event and a customer loyalty event; tracking lottery ticket purchases for respective players associated with the lottery event; generating a prize pot from the lottery ticket purchases; reserving a first portion of the prize pot for the main event and a second portion of said prize pot for the customer loyalty event; and paying qualifying ones of the respective players from the second portion based on a pre-determined formula.

Preferably, the tracking comprises monitoring the recency, frequency and intensity of lottery ticket purchases associated with said respective players.

More preferably, the pre-determined formula comprises a decay function incorporating the recency, frequency and intensity of lottery ticket purchases of a specified player.

Even more preferably, the paying qualifying ones of the respective players from the second portion comprises paying, on a pro rated basis, each of the qualifying ones of said respective players in accordance with an amount calculated using the decay function.

In accordance with a second aspect of the invention, there is provided a lottery terminal for processing lottery ticket purchase orders of respective players comprising: input means for receiving an identification associated with each of the respective players; interface means for communicating with: (i) a central database connected to a network, the central database storing said identifications and lottery ticket purchase orders of respective players, and (ii) a central processor for determining: (i) a prize pot from the lottery ticket purchase orders wherein the prize pot comprises a first portion associated with a main event and a second portion associated with a customer loyalty event, and (ii) a payout for qualifying ones of the respective players from the second portion based on a pre-determined formula; and display means for indicating the qualifying ones of the respective players.

The advantage of the present invention is now readily apparent. Not only are players rewarded for their loyalty when playing the lottery, they are rewarded according to the level of their loyalty where level of loyalty is determined using multiple aspects of a player's behaviour.

BRIEF DESCRIPTION OF THE DRAWINGS

A better understanding of the invention will be obtained by considering the detailed description below, with reference to the following drawings in which.

DESCRIPTION OF THE PREFERRED EMBODIMENT

Figure 1:
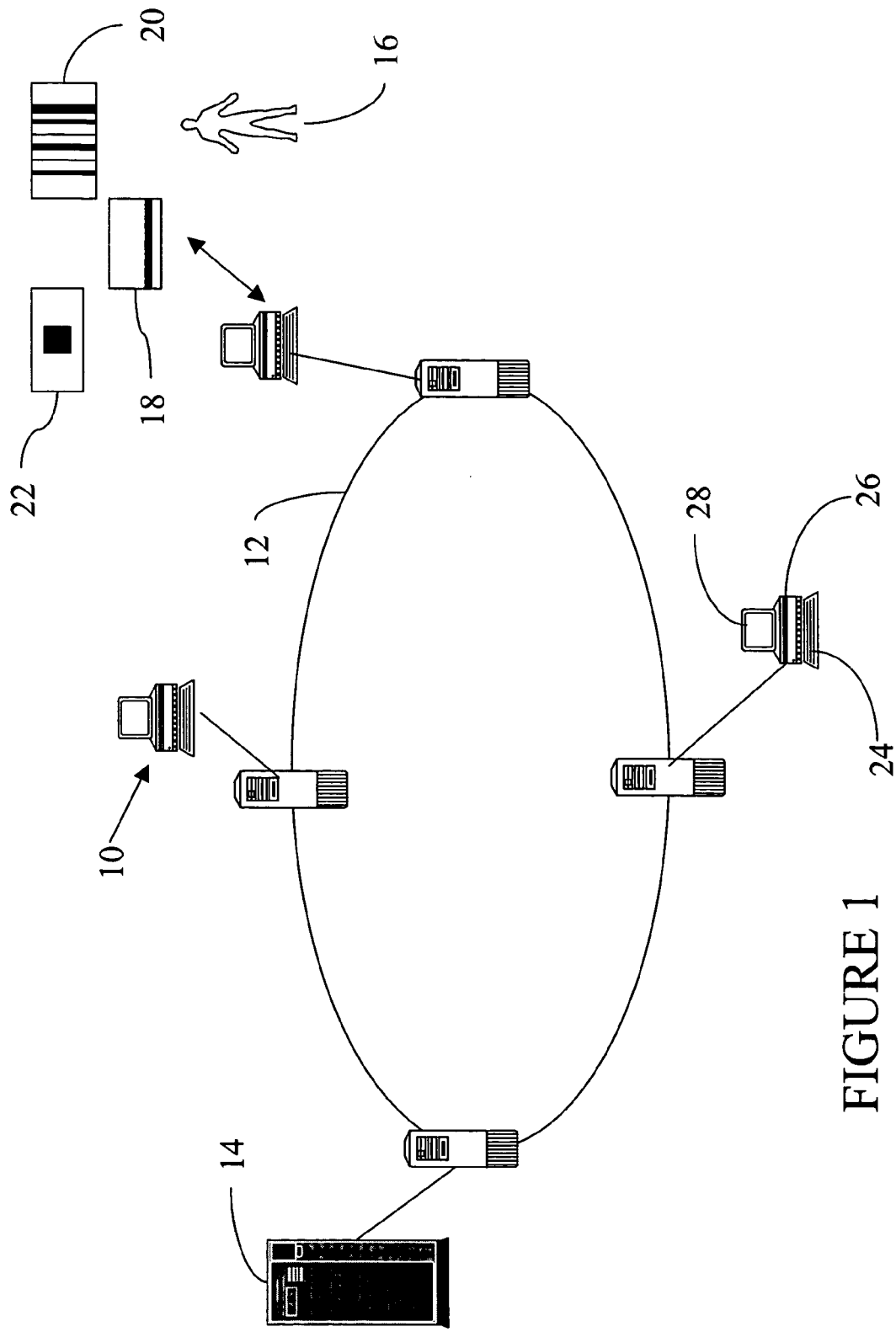
FIG. 1 is a network diagram highlighting the lottery system of the present invention.

Referring to FIG. 1, a network diagram highlighting the lottery system of the present invention is depicted. A plurality of lottery terminals 10 are connected to a network 12 which is in turn connected to a central server 14 comprising a central storage device and a central processor. Lottery terminals 10 are typically deployed at retails outlets throughout a city or larger territory to facilitate the purchase of lottery tickets. A lottery player 16 at a given location has an associated identification (ID). The identification may be stored on a smartcard 18, a barcode 20 or a radio frequency identification (RFID) tag 22 although the invention is not meant to be limited to these devices. Lottery terminal 10 comprises a keyboard 24, a processor 26, and a display 28. In addition, to accommodate to accommodate the above-noted ID storage devices, the lottery terminal may optionally include input means such as a barcode scanner (not shown) to facilitate automated reception of a player's ID.

Figure 2:
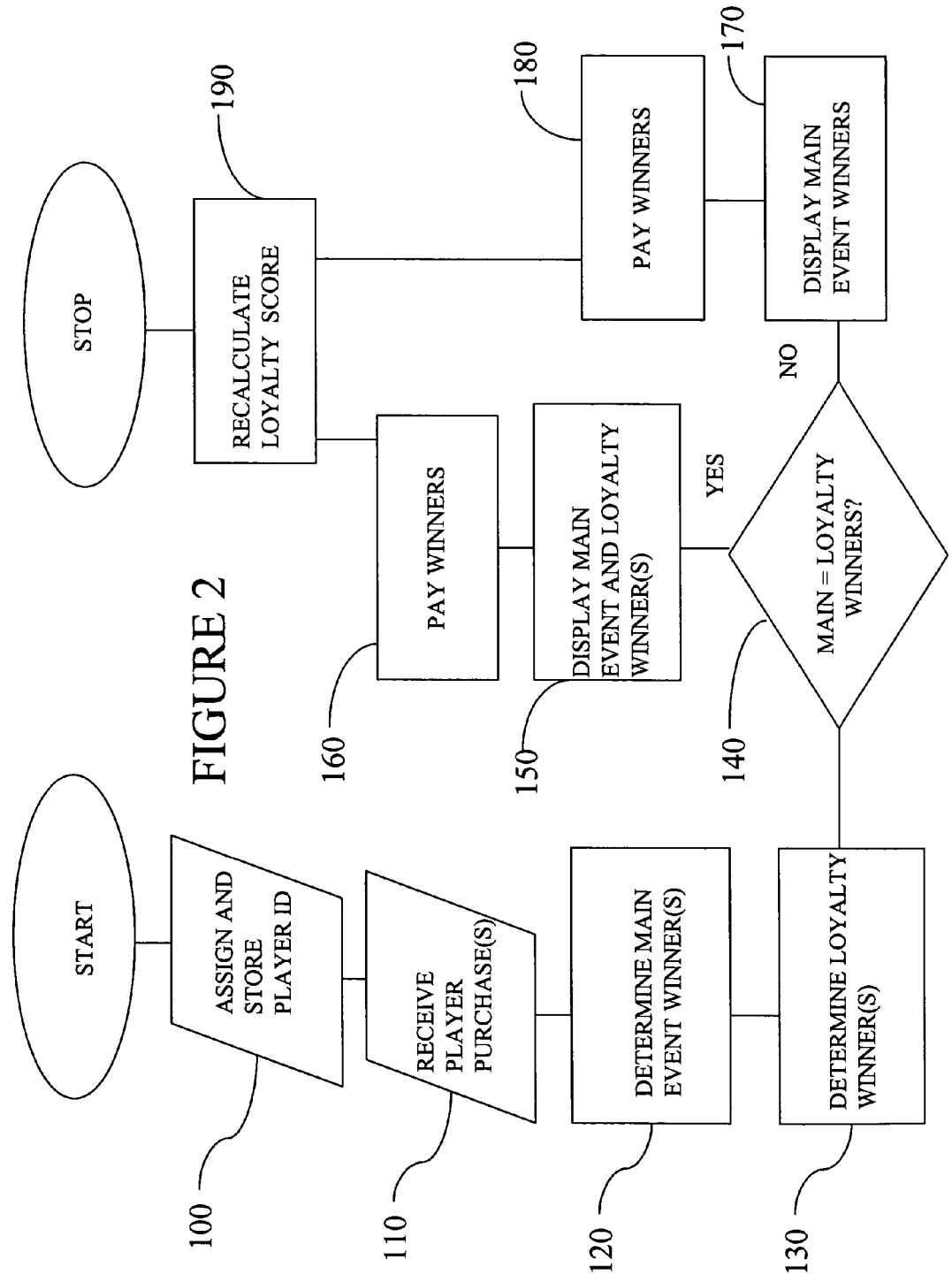
FIG. 2 is a flow chart depicting the steps performed by the system of the present invention.

Referring to FIG. 2, a flow chart depicting the steps performed by the system of the present invention is depicted. The lottery system proposed includes the tracking of customers' playing behaviour for, among other things, determining if a portion of the loyalty prize pot should be awarded. Such tracking is also useful for market research purposes. Tracking is based on player ID data. At step 100, a player identification is assigned and stored in the central storage device of central server 14. At step 110, each time a respective player makes a purchase of a lottery ticket it is recorded in the central storage device e.g. in one embodiment, the customer ID is stored in radio frequency identification tag (RFID) 22 which lottery terminal 10 reads and forwards (during a ticket purchase transaction) to central server 14, storing the player account information in the central storage device. The stored information need not include personal customer information. If the customer ID is stored on a smartcard (protected by a PIN, for example), customer details could be stored entirely locally on the customer's smartcard, thereby allaying any privacy concerns. The customer's identity typically will only be revealed upon winning.

As will be appreciated by those in the art, in a typical lottery, a player either selects or is randomly assigned a number when a ticket is purchased. At least a portion of the revenue generated from the lottery ticket sales forms part of a jackpot. The present invention contemplates reserving a fraction (e.g. approximately 5%) of the available prize money for a player loyalty reward pool. The loyalty reward is paid out on the basis of three criteria: (a) recency of player purchase; (b) frequency of player purchase; and (c) intensity of player purchase. In the event that several players select the winning number, the main prize (or so called Jackpot) would be equally divided amongst them. However, for those particularly loyal customers, additional moneys would be paid out from the player loyalty reward pool also known as a VIP pot. At step 120, the central processor determines if one or more players have won the jackpot by comparing the winning number with the numbers selected by each respective player. If one or more of the selected numbers match the winning numbers then those players are declared winners. At step 130, the central processor determines if there are any players eligible for the loyalty reward pot. As will be discussed in greater detail below, this is accomplished by comparing their loyalty score with an established threshold. If their score is greater then the threshold they will be deemed eligible for the loyalty reward pot. Further, the actual value of their loyalty score will determine the portion of the loyalty pot which they are awarded. In the event that any level of loyalty is to be rewarded, the threshold is simply set to zero such that a player having even a very low loyalty score which share in the VIP pot.

At step 140, the central processor determines if any of the players winning the jackpot match those players qualifying for the player loyalty reward pool. If the answers is "yes" then the main event and loyalty winners are displayed. More specifically, if a player requested the results at a selected lottery terminal 10, then the results would be uploaded and shown on display 26. At step 160, both the jackpot winners and loyalty reward players are paid out. At step 140 if the answer is "no" then only the jackpot winners are displayed and at step 180 the jackpot winners are paid out. Finally, at step 190 the loyalty score of respective players is recalculated to reflect the passage of the lottery event.

As discussed above, the three criteria used as a basis for determining: (a) if a customer qualifies for a loyalty reward payout and (b) the value of the loyalty reward payout are: (i) recency of player purchase; (ii) frequency of player purchase; and (iii) intensity of player purchase. Recency is defined as the proximity of a customer's purchase activity to a particular draw. Frequency is defined as how often (i.e. number of instances) a customer purchases a lottery ticket or tickets over a predefined time period prior to a particular draw. Intensity is defined as the number of lottery tickets purchased by the customer over the predefined time period for a particular draw. These variables are contained in a mathematical formula in the form of a decay function which is used to determine if a particular player is above a predefined threshold and, if so, how much of the loyalty reward pot should be awarded. For example, a winning customer who had purchased many tickets over several days in the weeks leading up to the lottery would qualify for a loyalty reward payout whereas a winning customer who had purchased a single ticket on the day of the lottery would not qualify for a loyalty reward payout. Each time a ticket is purchased by a specified player, the central database of central server 14 is updated with the purchasing history ultimately being used to calculate the payer's loyalty score.

As previously described, a player's share of the VIP pot is pro-rated using a function based on (a) recency; (b) frequency; and (c) intensity of play. To calculate the pro-rated winnings, we define a Unit of Participation (UP). A player's winning is the product of the pool and the ratio of their total UP to the total UP from all winners. In any one draw i, the UP may be generally characterized as follows:

$$UP_i = C(R_i, F_i, I_i) \tag{1}$$

Where C is a mathematical function for $R_i$ the recency component, $F_i$ the frequency component and $I_i$ the intensity component.

In one embodiment, C is a simple, unweighted product of the 3 components:

$$C(R_i,F_i,I_i)=R_i*F_i*I_i$$

R, F and I are derived from captured historical play data which describe the player's behaviour prior to the current draw, using a function defined for the purpose. R, F and I are described in more detail below:

1) Recency

Recency refers to any mathematical characterization of how recently the player has participated in the game. There will be some weighting in the function to favour players who participate in recent draws, ultimately giving them greater UP.

$$R_i=R(N_i) \quad (2)$$

Where R is a mathematical function for N, the number of draws missed between the last time the player participated in the game and the current draw.

One embodiment for R is:

$$R_i=(N_i+1)^D \quad (3)$$

Where D is an arbitrarily assigned coefficient of degradation, based on market research.

2) Frequency

Frequency refers to any mathematical characterization of how frequently the player participates in the game.

$$F_i=F(N_i,M) \quad (4)$$

Where F is a mathematical function for N, the number of draws participated out of a predefined M draws preceding the current draw.

One embodiment for F is:

$$F_i=(M-N_i+1)^D \quad (5)$$

Where D is an arbitrarily assigned coefficient of degradation, based on market research.

An alternate embodiment for F is based on a recursive function, not requiring tracking of the last M draws:

$$F_i=(B+F_{i-1})^E \quad (6)$$

Where B=1 if last draw was played or =0 if last draw was not played; E is an arbitrarily assigned coefficient of degradation, based on market research.

3) Intensity

Intensity refers to any mathematical characterization of how intensely the player participates in the game.

$$I_i=I(\$_i,N_i,M) \quad (7)$$

Where I is a mathematical function for $, the value of the bet wagered by the player in the $N_i$ draws the participated during the preceding M draws.

One embodiment for I is:

$$I_i=\log_a(\Sigma\$_N/N_i)+K \quad (8)$$

Where $\Sigma\$_N$ is a sum of all bets wagered by the player, N is the number of draws he participated out of the predefined M draw window, a is an arbitrarily assigned base and K is an arbitrarily assigned constant.

Yet another possible embodiment for I is:

$$I_i=1-\{1/[(\Sigma\$_N/N_i)-1]\} \quad (9)$$

Where $\Sigma\$_N$ is a sum of all bets wagered by the player in the last M draws preceding the current draw, N being the number of draws the player participated out of the M draws.

An alternate formula for I, based on a recursive function and not requiring tracking of the player's bet behaviour during the last M draws is:

$$I_i=CI(\$,I_{i-1}) \quad (10)$$

Where CI is a mathematical function for draw i, $ is the dollar amount wagered this draw and $I_{i-1}$ is I for the previous draw.

One embodiment for CI is:

$$CI(\$,I_{i-1})=\$+\alpha I_{i-1} \quad (11)$$

Where $0<\alpha<=1$

It is possible to calculate meaningful values for (1) recency (2) frequency (3) intensity of play for all special cases:
(a) considering just the previous draw—in this case (1) and (2) become essentially binary values;
(b) considering records for any chosen subset of draws (M) preceding the current draw (ie. last 100, last 11 Saturdays etc.);
(c) considering records from the beginning of the game; or
(d) it is also possible to assign different weight to different categories of records (ie. older records weigh less, Saturdays weigh more etc.) by modifying the above functions.

It will be understood by those in the art that the above embodiments are for illustration purposes only. There is, in principle, no inherent constraint as to how the mathematical functions C, CI, CR, CF may be constructed. They are simply designed to ensure that the value of the decay function rises proportionally with rising recency, frequency and intensity of play within desired windows of values for recency, frequency and intensity. Further, the value of the decay function is designed not to rise above a predefined threshold, or its growth becomes insignificant above the predefined threshold. In operation, as a player's frequency, intensity and recency decreases over time, their share of the VIP pot is diminished accordingly. Once a player falls below a predefined threshold they are no longer eligible for the VIP pot.

A straight-forward formulation for a lottery which has all 3 elements of the loyalty program and which has the simplicity of explanation to the playing public is:

$$UP=UP_{i-1}+\$+\alpha L+\beta F \quad (12)$$

Where $ is the current wager in cents (Intensity),
L=1 if last draw not played, 0 if played (Recency),
F=1, a constant signifying the current play (Frequency)
$\alpha$, $\beta$ are scaling functions, eg. $\alpha=-100$, $\beta=5$ While the current invention is intended to encourage player loyalty and participation in a game of chance, it is recognized that the scheme could be misused resulting in gaming addiction. Responsible organizers of games of chance could easily mitigate the likelihood of problem gaming by setting a cap in UP such that a player whose UP exceeds a pre-set limit of L will be considered to have UP of L, both for the current draw's calculation and for carrying forward where a recursive function is used. Another valid approach to solve this problem would be to structure the functions for R, F and I in a way that offers steeply diminishing return: UP grows significantly with growing R, F, and I in the range considered acceptable, but offers only minimal increases beyond it. This approach is present in some of the example embodiments presented above.

When the UP for all players has been calculated, the prize will be divided by the sum of all UPs to arrive at a unit prize and each player's winning will be the product of this unit prize and his UP. It is also possible to apply this concept to a prize level other than the Jackpot prize. For example, in a lottery game with 3 prize levels (e.g. Match-6, Match-5 and Match-4), a portion of the prize pool could be set aside for the VIP pot such that players could participate in the loyalty game at one or more of the 3 prize levels. It is particularly useful to have a VIP pot for the lowest prize tier to generate day-to-day interest in the game.

It should also be appreciated by those in the art, that a lottery is not the only game that could incorporate this loyalty feature. A VIP pot could be established for any pari-mutuel or non-pari-mutuel game. If the VIP pot is applied to all players, then the VIP pot becomes a discount that is applied to the ticket price of the player, the rate of discount being determined by "loyalty" only. The discount can thus be applied at purchase rather than after the draw. We thus use last draw's UP to arrive at a discount rate:

(a) discount calculated for draw N−1 will be applied to ticket for draw N, but only if the player participates in draw N; if player chooses not to participate in draw N, this particular discount is lost to the player;

(b) any consistent criteria can be used to "time shift" application of discount—for instance: discount calculated on Saturday can be applied only against ticket for the next Saturday draw; discount calculated for "special draw" can only be applied against ticket for another "special draw"; and (c) discount totals can be accumulated for the player until it reaches the value of the ticket, at which point free ticket is offered to the player.

This approach can be also used for promotion of another pari-mutuel or non-pari-mutuel game, in which case the last draws's UP from game A is used to calculate discount rate of ticket for game B—while all options (a, b, c) above remain valid and can be used.

The method of the present invention may be implemented in any conventional computer programming language for use with many computer architectures or operating systems. For example, preferred embodiments may be implemented in a procedural programming language (e.g. "C") or an object oriented language (e.g. "C++") for use with a Unix operating system in an optical network. Further, the method of the present invention can be implemented as a computer program product for use with central server 14. Such implementation may include a series of computer instructions fixed either on a tangible medium, such as a computer readable medium (e.g., a diskette, CD-ROM, ROM, or fixed disk) or transmittable to the central server 14, via a modem or other interface device, such as a communications adapter connected to network 12 over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Furthermore, such instructions are stored in the central storage device which may be a semiconductor, magnetic, optical or other memory device, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with onto the central server 14 (e.g., on system ROM or fixed disk), or distributed from a server (not shown) over the network 12. Of course, some embodiments of the invention may be implemented as a combination of both software (e.g., a computer program product) and hardware. Still other embodiments of the invention may be implemented as entirely hardware, or entirely software.

Although various exemplary embodiments of the invention have been disclosed, it should be apparent to those skilled in the art that various changes and modifications can be made which will achieve some of the advantages of the invention without departing from the true scope of the invention.

A person understanding this invention may now conceive of alternative structures and embodiments or variations of the above all of which are intended to fall within the scope of the invention as defined in the claims that follow.

We claim:

1. A method for promoting customer loyalty comprising:
   (a) establishing a lottery event comprising a main event and a customer loyalty event;
   (b) tracking lottery ticket purchases for respective players associated with said lottery event, said tracking comprising:
      processing, in a data processing system, lottery ticket purchase orders respectively associated with the lottery ticket purchases;
      receiving, at an input device, identification numbers respectively associated with each of said respective players; and
      storing in a central database connected to said data processing system said identification numbers and said lottery ticket purchase orders;
   (c) said data processing system determining a prize pot from said lottery ticket purchases;
   (d) said data processing system programmed to reserve a first portion of said prize pot for said main event and a second portion of said prize pot for said customer loyalty event; and
   (e) said data processing system determining a payout for qualifying ones of said respective players from said second portion based on a pre-determined formula, said qualifying ones of said respective players being determined based at least in part on the lottery ticket purchase orders;

wherein said step of determining a payout for qualifying ones of said respective players from said second portion is contingent on each of said qualifying ones of said respective players from said second portion winning said main event.

2. The method of claim 1 wherein said tracking comprises monitoring the recency, frequency and intensity of lottery ticket purchases associated with said respective players.

3. The method of claim 2 wherein said pre-determined formula comprises a mathematical formula incorporating the recency, frequency and intensity of lottery ticket purchases of a specified player.

4. The method of claim 3 wherein said mathematical formula is a decay function having the following characteristics:
   (a) a calculated value associated with said decay function rises proportionally if said recency, frequency or intensity rises within a predetermined window of values for each of said recency, frequency or intensity; and
   (b) said calculated value associated with said decay function approaches a predefined maximum above a predefined threshold.

5. The method of claim 4 wherein said step of determining a payout for qualifying ones of said respective players from said second portion comprises determining a payout, on a pro rated basis, each of said qualifying ones of said respective players from said second portion in accordance with an amount calculated using said decay function.

6. The method of claim 5 wherein said first portion is divided equally among said respective players winning said main event.

7. The method of claim 1 wherein said identification numbers are stored in respective barcodes and wherein a barcode associated with a purchasing player is scanned by said input device and said stored identification number downloaded into said central database upon purchase of a lottery ticket.

8. The method of claim 1 wherein said identification numbers are stored in respective radio frequency identification tags and wherein said stored identification number is transmitted to said input device and downloaded to said central database upon purchase of a lottery ticket.

9. The method of claim 1 wherein said identification numbers are stored in respective smartcards and wherein a smartcard associated with a purchasing player is swiped through said input device and the stored identification number downloaded to said central database upon purchase of a lottery ticket.

10. A system for promoting customer loyalty comprising:
(a) a lottery terminal for processing lottery ticket purchase orders of respective players;
(b) an input device for receiving an identification associated with each of said respective players;
(c) a central database connected to said lottery terminal via a network for storing said identifications and lottery ticket purchase orders of respective players;
(d) a central processor for determining: (i) a prize pot from said lottery ticket purchase orders wherein said prize pot comprises a first portion associated with a main event and a second portion associated with a customer loyalty event, and (ii) a payout for qualifying ones of said respective players from said second portion based on a pre-determined formula; and
(e) a display for indicating said qualifying ones of said respective players;

wherein said central processor determines a payout for qualifying ones of said respective players from said second portion contingent on each of said qualifying ones of said respective players from said second portion winning said main event.

11. The system of claim 10 wherein said pre-determined formula comprises a mathematical formula incorporating the recency, frequency and intensity of lottery ticket purchases of a specified player.

12. The system of claim 11 wherein said mathematical formula is a decay function having the following characteristics:
(a) a calculated value associated with said decay function rises proportionally if said recency, frequency or intensity rises within a predetermined window of values for each of said recency, frequency or intensity; and
(b) said calculated value associated with said decay function becomes insignificant above a predefined threshold.

13. The system of claim 12 wherein said paying qualifying ones of said respective players from said second portion comprises paying, on a pro rated basis, each of said qualifying ones of said respective players from said second portion in accordance with an amount calculated using said decay function.

14. The system of claim 13 wherein said first portion is divided equally among said respective players winning said main event.

15. The system of claim 10 wherein said identifications are stored in respective barcodes and wherein a barcode associated with a purchasing player is scanned by said input means and said stored identification downloaded into said central database upon purchase of a lottery ticket.

16. The system of claim 10 wherein said identifications are stored in respective radio frequency identification tags and wherein said stored identification is transmitted to said input means and downloaded to said central database upon purchase of a lottery ticket.

17. The system of claim 10 wherein said identifications are stored in respective smartcards and wherein a smartcard associated with a purchasing player is swiped through said input means and said stored identification downloaded to said central database upon purchase of a lottery ticket.

18. A lottery terminal for processing lottery ticket purchase orders of respective players comprising:
(a) input means for receiving an identification associated with each of said respective players;
(b) interface means for communicating with: (i) a central database connected to a network, said central database storing said identifications and lottery ticket purchase orders of respective players, and (ii) a central processor for determining: (A) a prize pot from said lottery ticket purchase orders wherein said prize pot comprises a first portion associated with a main event and a second portion associated with a customer loyalty event, and (B) a payout for qualifying ones of said respective players from said second portion based on a pre-determined formula contingent on each of said qualifying ones of said respective players from said second portion winning said main event; and
(c) display means for indicating said qualifying ones of said respective players.

19. A non-transitory computer readable medium having computer instructions stored thereon, which when executed by a central processor cause the processor to:
(a) establish a lottery event comprising a main event and a customer loyalty event;
(b) track lottery ticket purchases for respective players associated with said lottery event;
(c) generate a prize pot from said lottery ticket purchases;
(d) reserve a first portion of said prize pot for said main event and a second portion of said prize pot for said customer loyalty event; and
(e) pay qualifying ones of said respective players from said second portion based on a pre-determined formula contingent on each of said qualifying ones of said respective players from said second portion winning said main event.

* * * * *